(12) United States Patent
Hsieh et al.

(10) Patent No.: US 9,167,528 B2
(45) Date of Patent: Oct. 20, 2015

(54) POWER SAVING METHOD AND RELATED MOBILE DEVICE

(71) Applicant: HTC Corporation, Taoyuan County (TW)

(72) Inventors: Wen-Jui Hsieh, Taoyuan County (TW); Ching-Hao Lee, Taoyuan County (TW); Yi-Li Lin, Taoyuan County (TW); Chang-Hsin Su, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 66 days.

(21) Appl. No.: 13/848,745

(22) Filed: Mar. 22, 2013

(65) Prior Publication Data

US 2013/0252674 A1 Sep. 26, 2013

Related U.S. Application Data

(60) Provisional application No. 61/614,531, filed on Mar. 23, 2012.

(51) Int. Cl.
*H04W 76/04* (2009.01)
*H04W 52/02* (2009.01)

(52) U.S. Cl.
CPC ............ *H04W 52/0251* (2013.01); *Y02B 60/50* (2013.01)

(58) Field of Classification Search
CPC ............ H04W 76/046; H04W 76/048; H04W 76/068
USPC .................................. 455/418, 566; 709/204
See application file for complete search history.

(56) References Cited

U.S. PATENT DOCUMENTS

| | | | |
|---|---|---|---|
| 6,594,238 B1 * | 7/2003 | Wallentin et al. | 370/252 |
| 2003/0135769 A1 * | 7/2003 | Loughran | 713/310 |
| 2005/0239518 A1 * | 10/2005 | D'Agostino et al. | 455/574 |
| 2007/0189251 A1 * | 8/2007 | Hou | 370/338 |
| 2007/0234208 A1 * | 10/2007 | Scott | 715/700 |
| 2008/0081659 A1 * | 4/2008 | Lim | 455/552.1 |
| 2008/0086528 A1 * | 4/2008 | Garg et al. | 709/204 |
| 2008/0113665 A1 * | 5/2008 | Paas et al. | 455/426.1 |
| 2008/0220829 A1 * | 9/2008 | Akama et al. | 455/574 |
| 2009/0124212 A1 * | 5/2009 | Islam et al. | 455/70 |
| 2009/0327782 A1 * | 12/2009 | Ballou et al. | 713/330 |
| 2010/0323647 A1 * | 12/2010 | Ryu et al. | 455/127.5 |
| 2011/0025599 A1 * | 2/2011 | Kim | 345/156 |

(Continued)

FOREIGN PATENT DOCUMENTS

| | | |
|---|---|---|
| CN | 102236403 A | 11/2011 |
| CN | 102387138 A | 3/2012 |

(Continued)

OTHER PUBLICATIONS

Office action mailed on Oct. 7, 2014 for the Taiwan application No. 102110489, filing date Mar. 25, 2013, p. 1-8.

(Continued)

*Primary Examiner* — Nathan Taylor
(74) *Attorney, Agent, or Firm* — Winston Hsu; Scott Margo

(57) ABSTRACT

A power saving method for a mobile device in a wireless communication system is disclosed. The power saving method comprises detecting a screen status of the mobile device and switching to different connection states according to the screen status of the mobile device when the mobile device has no data transmission and reception.

11 Claims, 6 Drawing Sheets

(56) References Cited

U.S. PATENT DOCUMENTS

| | | |
|---|---|---|
| 2011/0175826 A1 | 7/2011 | Moore |
| 2011/0294535 A1* | 12/2011 | Aoyagi et al. ............... 455/525 |
| 2012/0077554 A1* | 3/2012 | Ahn et al. .................... 455/574 |
| 2012/0184246 A1* | 7/2012 | Miwa et al. .................. 455/410 |
| 2012/0264416 A1* | 10/2012 | Pica et al. ................. 455/422.1 |
| 2012/0280917 A1* | 11/2012 | Toksvig et al. .............. 345/173 |
| 2012/0287058 A1 | 11/2012 | Lee |
| 2013/0122888 A1* | 5/2013 | Willars ........................ 455/418 |
| 2013/0322316 A1* | 12/2013 | Hara et al. ................... 370/311 |

FOREIGN PATENT DOCUMENTS

| | | |
|---|---|---|
| TW | 200625956 | 7/2006 |
| TW | 200838337 | 9/2008 |
| TW | 201041364 | 11/2010 |
| TW | M409654 | 8/2011 |

OTHER PUBLICATIONS

Office action mailed on Jun. 19, 2015 for the China application No. 201310097619.4, filing date Mar. 25, 2013.

* cited by examiner

POWER SAVING METHOD AND RELATED MOBILE DEVICE

CROSS REFERENCE TO RELATED APPLICATIONS

This application claims the benefit of U.S. Provisional Application No. 61/614,531 filed on Mar. 23, 2012 and entitled "Fast dormancy methods selection with monitor on and off", the contents of which are incorporated herein.

BACKGROUND OF THE INVENTION

1. Field of the Invention

The present invention relates to power saving for a mobile device in a wireless communication system, and more particularly, to a power saving method, which switches the mobile device to different connection states according to a screen status of the mobile device and related mobile device.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS (Quality of Service) requirements simultaneously, providing diverse flexible two-way transmission services and better communication quality to reduce transmission interruption rates.

In the WCDMA protocol, a fast dormancy feature can allow wireless communication device go to idle directly (shown in FIG.1) or go to Cell_PCH state (or Cell_FACH state) in certain period (shown in FIG. 2). While no data transmission and reception, a mobile device can send different types of SCRI (Signaling Connection Release Indication) to trigger the network to indicate the mobile device to go to Cell_PCH (or Cell_FACH) or idle state.

The Cell_PCH (or Cell_FACH) state can allow the mobile device re-setup the wireless link faster than the idle state. However, generally, the Cell_PCH (or Cell_FACH) state has smaller DRX cycle length than the idle state, as shown in FIG. 3 and FIG 4. The smaller DRX cycle length, however, costs more average standby current.

Because a mobile device may be powered by a battery, use of these features causes the battery level to reduce. The battery must eventually be recharged, which maybe inconvenient to a user. Thus, a desire exists for reducing power consumption in mobile devices in order to prolong time between battery charges.

SUMMARY OF THE INVENTION

It is therefore an objective of the present disclosure to provide a power saving method for a mobile device in a wireless communication system.

A power saving method for a mobile device in a wireless communication system is disclosed. The mobile device has a screen. The power saving method comprises detecting a screen status of the mobile device and switching the mobile device to different connection states according to the screen status of the mobile device when the mobile device has no data transmission and reception.

A mobile device in a wireless communication system is disclosed. The mobile device comprises a screen, an application processor and a modem. The application processor is coupled to the screen and used for detecting a screen status of the screen. The modem is couple to the application processor and used for switching the mobile device to different connection states according to the detected screen status when the mobile device has no data transmission and reception.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
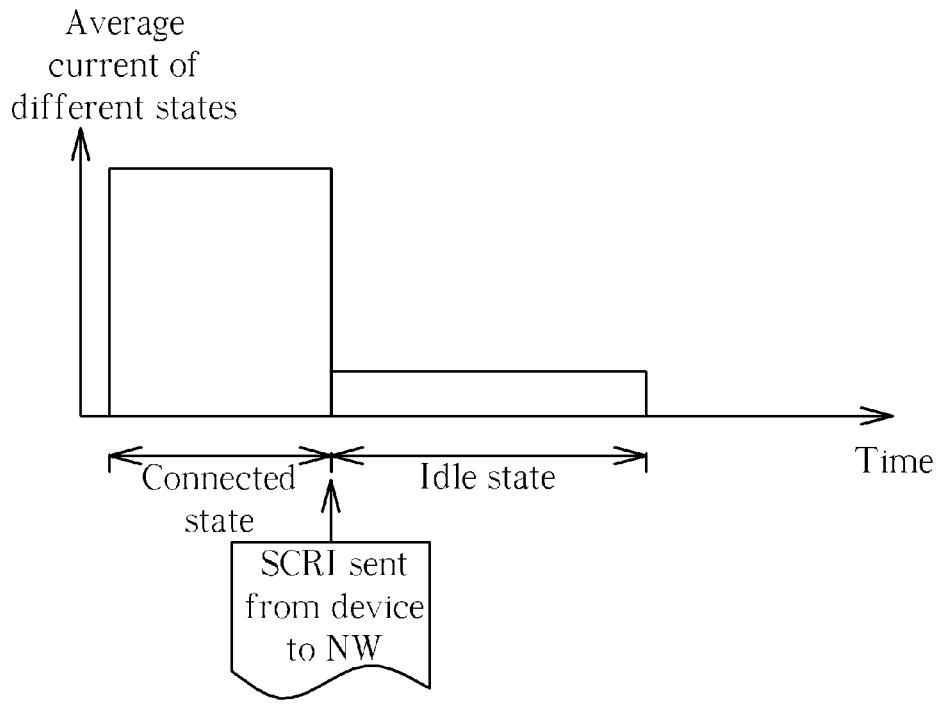
FIG. 1 illustrates a relationship of an average current in different states vs. time.
Figure 2:
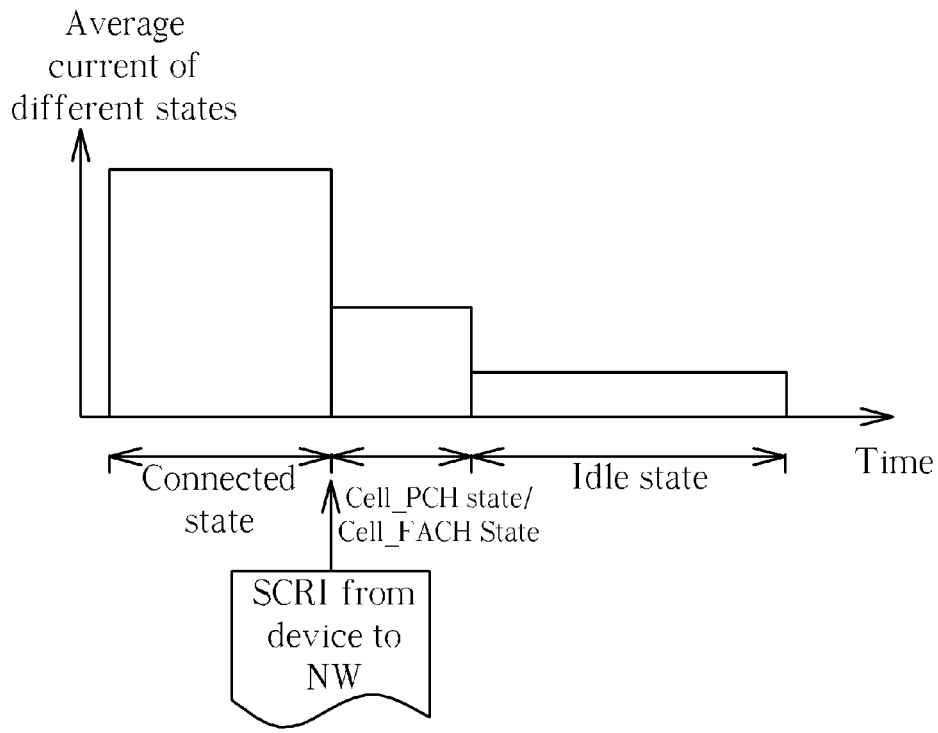
FIG. 2 illustrates a relationship of an average current in different states vs. time.
Figure 3:
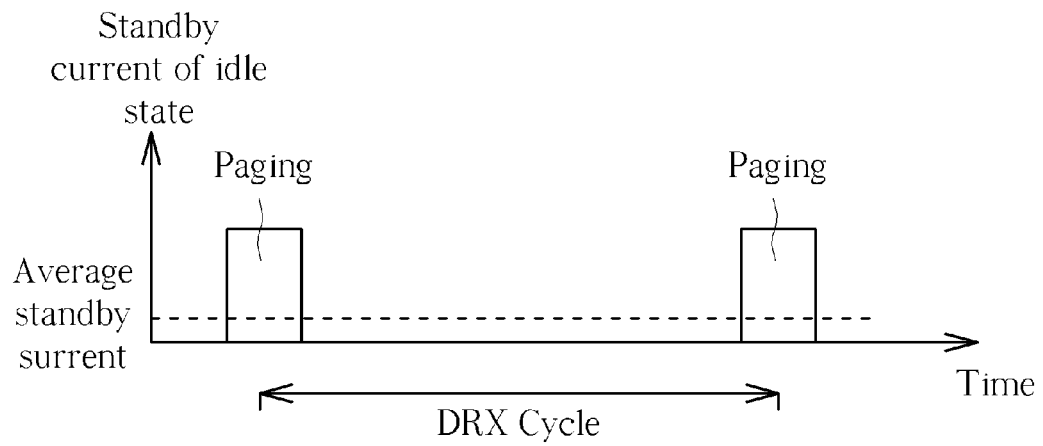
FIG. 3 illustrates a DRX cycle in an idle state.
Figure 4:
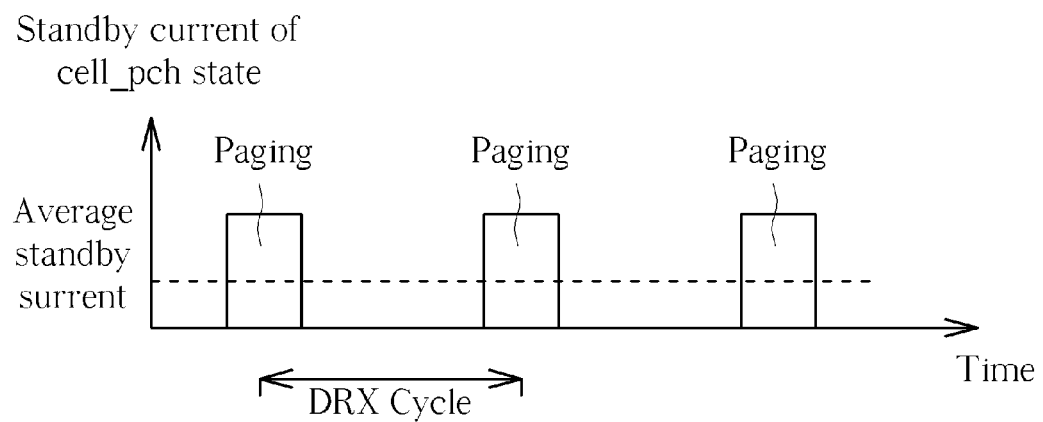
FIG. 4 illustrate a DRX cycle in a Cell_PCH state.
Figure 5:
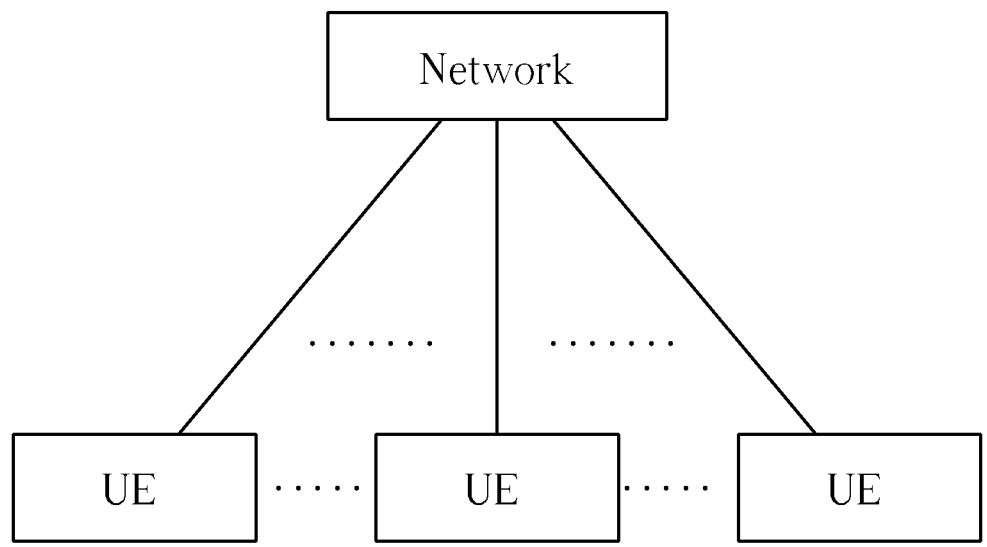
FIG. 5 is a schematic diagram of an exemplary wireless communication system.

Please refer to FIG. 5, which is a schematic diagram of an exemplary wireless communication system 50. The wireless communication system 50 is briefly composed of a network and a plurality of user equipments (UEs). The wireless communication system 50 may be in compliance with Wideband Code Division Multiple Access (WCDMA), Universal Mobile Telecommunications System (UMTS), or Evolved Packet System (EPS) technology. The network may be a UMTS Terrestrial Radio Access Network (UTRAN) in the WCDMA/HSPA technology, or an Evolved-UTRAN (E-UTRAN) in the LTE/LTE-Advanced technology. The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 6:
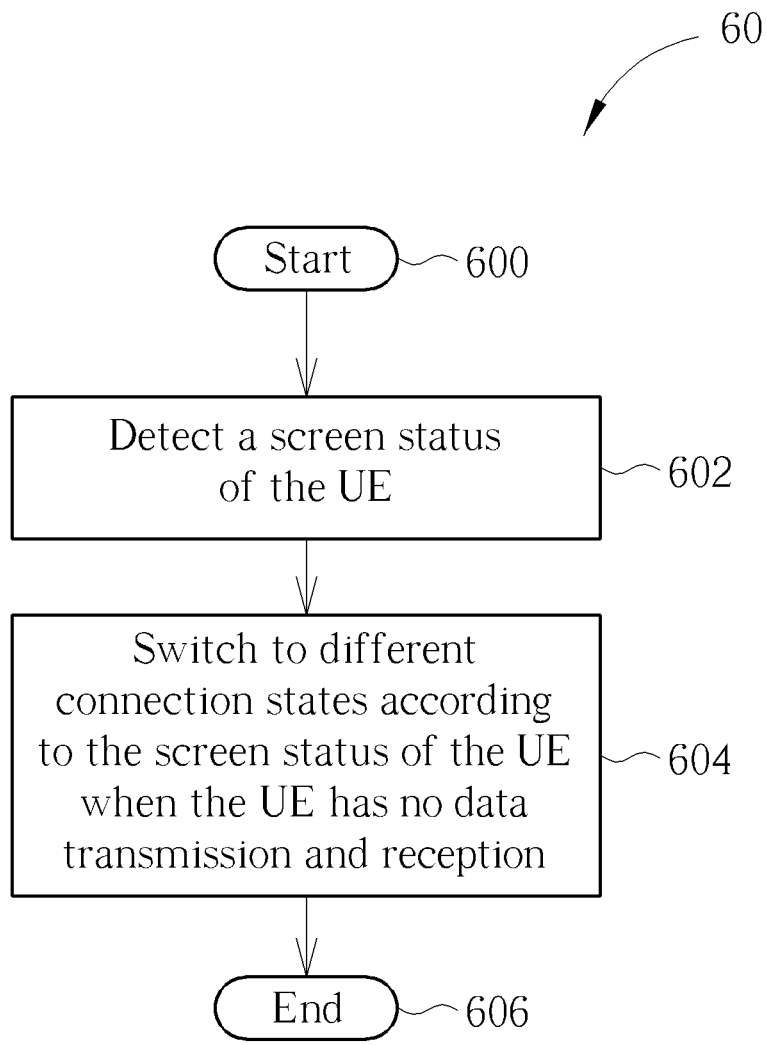
FIG. 6 is a flow chart of an exemplary process.

Please refer to FIG. 6, which is a flow chart of an exemplary process 60. The process 60 is used for a UE in the wireless communication system 50 for power saving. The process 60 can include the following steps:

Step 600: Start.

Step 602: Detect a screen status of the UE.

Step 604: Switch to different connection states according to the screen status of the UE when the UE has no data transmission and reception.

Step 606: End.

According to the process 60, the UE detects the screen status. The screen status indicates whether a screen of the UE is on or off. Then, the UE switches to the different connection states according to the screen status when the UE has no data transmission and reception (e.g. with a network or another communication device). The UE in the different connection states has the different power consumption. The UE switches from a first connection state to a second connection state when the screen status indicates a screen of the mobile device is on and switches from the first connection state to a third connection state when the screen status indicates the screen of the mobile device is off. The first connection state has more power consumption than the second connection state and the second connection state has more power consumption than the third connection state. After switching from the first connection state to the second connection state, when the UE stays in the second connection state for a predetermined time, the UE switches from the second connection state to the third connection state. Preferably, the predetermined time is determined by the network.

In order to switch to the different states, the UE adopts different fast dormancy mechanisms. When the screen is ON, the UE adopts the first fast dormancy mechanism to switch to the second connection state. When the screen is OFF, the UE adopts the second fast dormancy mechanism to switch to the third connection state. For example, in WCDMA system, a connected state has more power consumption than a Cell_PCH (or Cell_FACH) state and the Cell_PCH (or Cell_FACH) state has more power consumption than an Idle state due to a smaller DRX cycle length (as shown in table (1) below). While the screen is ON, a user need faster link setup time. Establishing a link in the Cell_PCH (or Cell_FACH) state is faster than in the idle state. Therefore, the UE can adopt the first fast dormancy mechanism which goes to Cell_PCH (or Cell_FACH) while no data transmission and reception. When the UE stays in the Cell_PCH (Cell_FACH) for a period of time, the UE further switches to the idle state. While the screen is OFF, a user does not need faster link setup time. The UE can save the standby power by adopting the second fast dormancy mechanism which goes to idle state after no data transmission and reception. In LTE system, a connected state has more power consumption than a Connected Discontinuous Reception (CDRX) state and the CDRX state has more power consumption than an Idle state due to a smaller DRX cycle length. After no data transmission and reception, the UE enters the CDRX state in a certain period. The CDRX state allows faster recovery of the data transmission but cost more current than the idle state. The UE may indicate to the network that the screen is OFF through a new command. Therefore, the network can indicate to the UE whether to go to the idle mode directly. For power saving, the UE can adopt an appropriate fast dormancy mechanism to switch to the different states according to the screen status.

TABLE (1)

|  | network (real used) | unit |
| --- | --- | --- |
| Cell_PCH (DRX = 320 ms) | 6.54 | mA |
| Idle (DRX = 640 ms) | 4.78 | mA |
| Power Saving | 27 | % |

According to the table (1), for the Cell_PCH state, the average current is 6.54 mA in the DRX cycle of 320 ms. For the idle state, the average current is 4.78 mA in the DRX cycle of 640 ms. The Idle state current consumption is 27% lower than the Cell_PCH state.

Further, a selection table can be used to indicate correspondence of the different fast dormancy mechanisms (or the different connection states) and the screen status. The UE can adopt an appropriate fast dormancy to switch to a corresponding connection state according to the selection table. Preferably, the selection table could be stored in the UE (e.g. memory). A table (2) illustrates an exemplary selection table of the present disclosure:

TABLE (2)

| Screen status | Fast dormancy |
| --- | --- |
| Screen ON | Go to Cell_PCH (or Cell_FACH) state for a certain period. |
| Screen OFF | Go to idle state |

Figure 7:
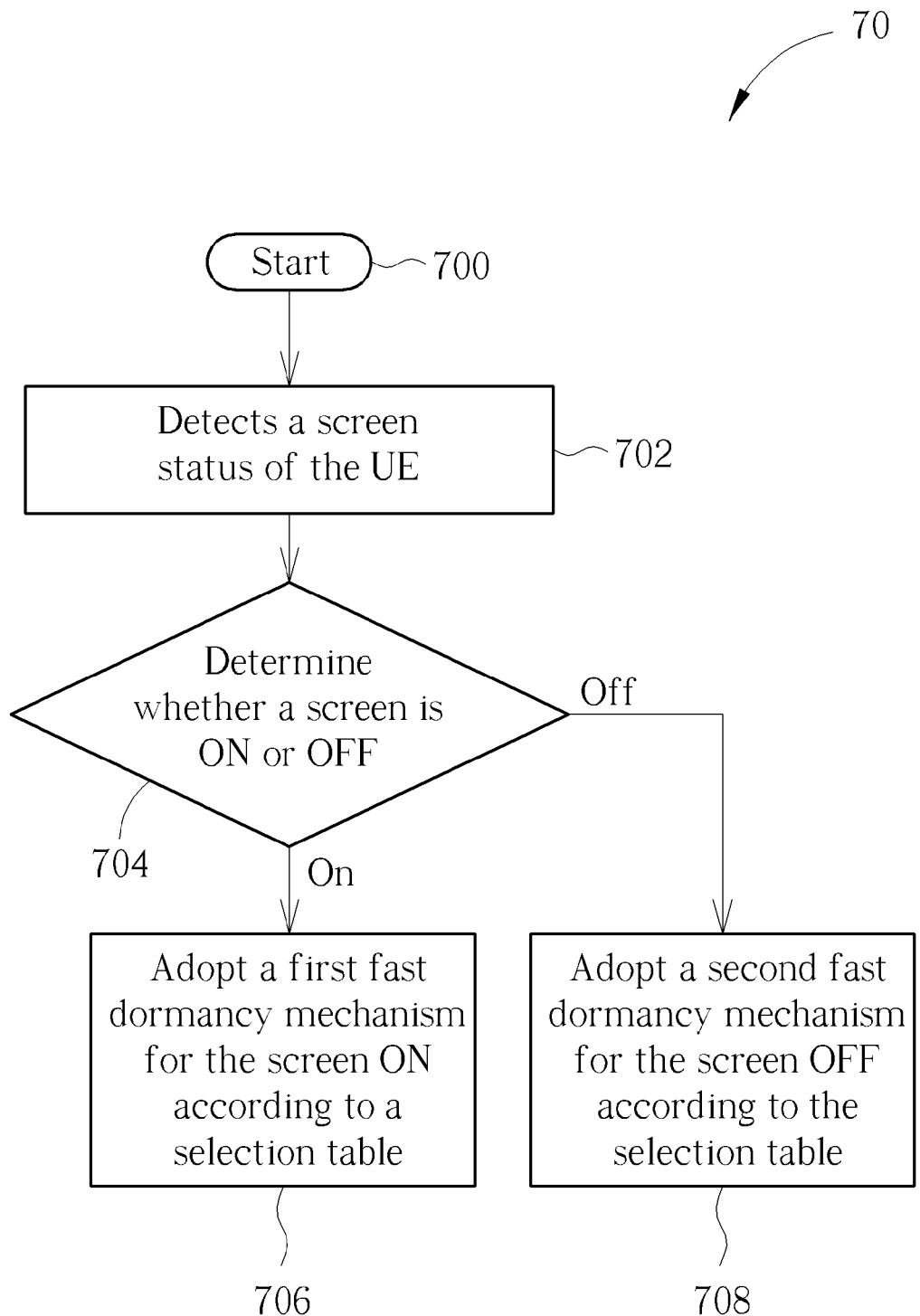
FIG. 7 is a flow chart of an exemplary process.

According to table (2), the UE adopts the fast dormancy mechanism which goes to the Cell_PCH (or Cell_FACH) state for the screen ON and adopts the other fast dormancy mechanism which goes to the idle state for the screen OFF. The aforementioned description can be synthesis into another exemplary process 70 as shown in FIG. 7. The process 70 is used for a UE in the wireless communication system 50 for power saving and includes the following steps:

Step 700: Start.

Step 702: Detects a screen status of the UE.

Step 704: Determine whether a screen is ON or OFF. If the screen is ON, go to the Step 706; if the screen is OFF, go to the Step 708.

Step 706: Adopt a first fast dormancy mechanism for the screen ON according to a selection table.

Step 708: Adopt a second fast dormancy mechanism for the screen OFF according to the selection table.

The detailed description of the process 70 can be found above, thus omitted.

Figure 8:
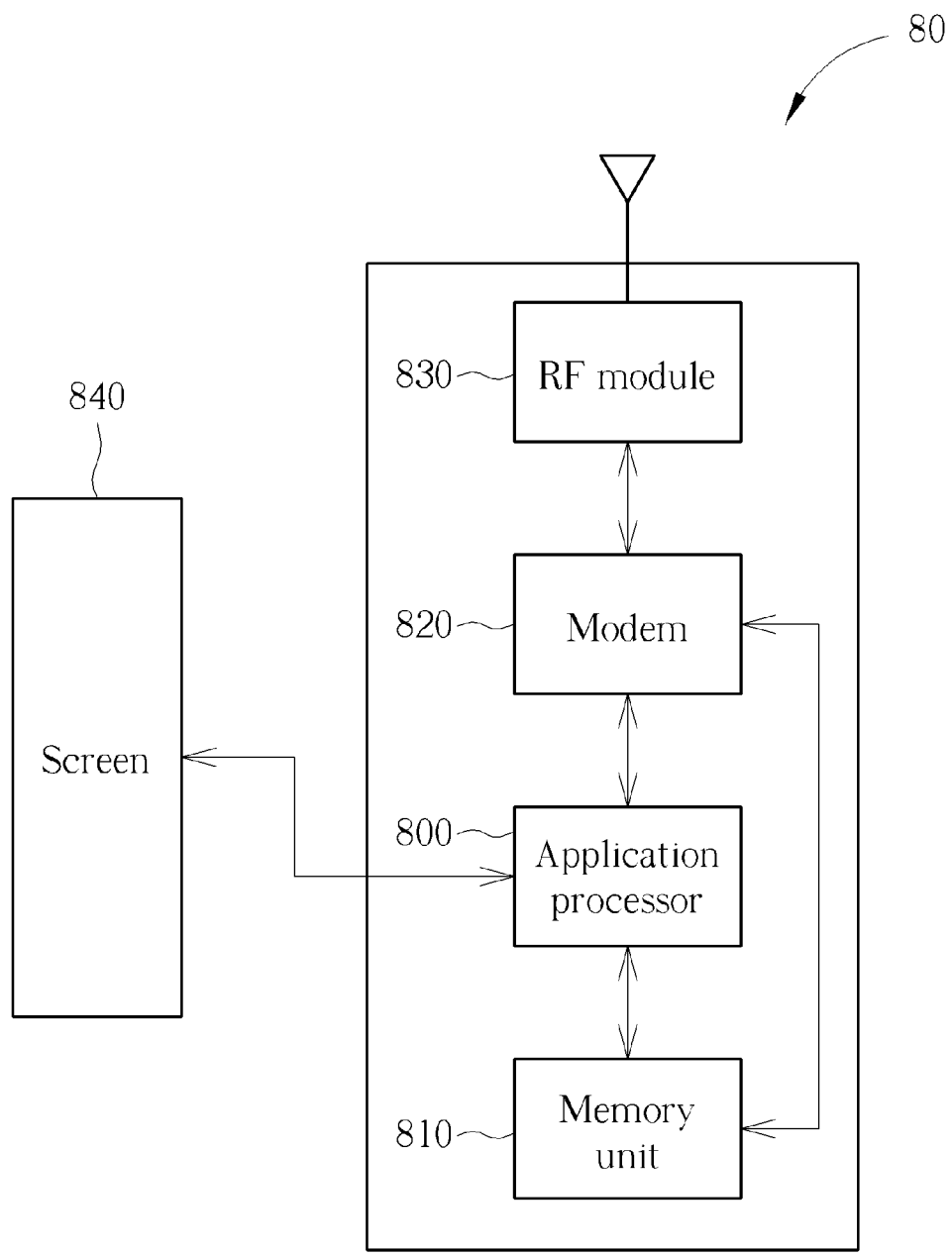
FIG. 8 is a schematic diagram of an exemplary mobile device.

The operation of the process 60 and the process 70 can be implemented by a mobile device 80. Please refer to FIG. 8, which is a schematic diagram of an exemplary communication device 80. The mobile device 80 can be the UE shown in FIG. 5 and may include an application processor 800 such as a microprocessor or ASIC, a memory unit 810, a modem 820, a RF module 830 and a screen 840. The application processor 800 is coupled to the screen 840 for detecting a screen status of the screen 840 and informs the screen status to the modem 820. The modem 820 is coupled to the application processor 800 and is used for switching the mobile device 80 to different connection states according to the screen status. Preferably, the modem 820 can support at least two type of fast dormancy mechanism. When no data transmission and reception occurs, the modem 820 switches the mobile device 80 from a first connection state to a second connection state if the screen 840 is "ON" and switches the mobile device 80 from the first connection state to a third connection state if the screen 840 is "OFF". The first connection state has more power consumption than the second connection state and the second connection state has more power consumption than the third connection state. The memory unit 810 may be any data storage device that can store a selection table to indicate correspondence of the different fast dormancy mechanisms (or connection states) and the screen status. Examples of the memory unit 810 include but are not limited to a subscriber identity module (SIM), read-only memory (ROM), random-access memory (RAM), CD-ROMs, magnetic tapes, hard disks, and optical data storage devices. The RF module 830 is preferably a radio transceiver for wirelessly communicating with the network according to the application processor 800.

The detail operation of the mobile device 80 can be found above, thus omitted herein.

To sum up, the application processor detects a screen status of the UE. The modem can switch to different connection states according to the screen status when the UE has no data transmission and reception. Namely, the modem adopts an appropriate fast dormancy to switch to the different connection states. In the WCDMA system, the modem switches from a connected state to a Cell_PCH state when the screen is "ON", and will further switch to an Idle state when the UE stays in the Cell_PCH for a period of time. The modem switches from the connected state to the Idle state directly when the screen is "OFF". Since a user does not need faster link setup time when the screen is OFF, entering to the Idle state directly can achieve power saving purpose.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power saving method for a mobile device in a wireless communication system, the mobile device having a screen, the power saving method comprising:
    detecting whether a screen status of the mobile device is on or off; and
    switching to different connection states according to whether the screen status of the mobile device is on or off when the mobile device has no data transmission and reception, comprising:
        switching from a first connection state to a second connection state when the screen status indicates the screen of the mobile device is on; and
        switching from the first connection state to a third connection state when the screen status indicates the screen of the mobile device is off,
    wherein, the first connection state has more power consumption than the second connection state and the second connection state has more power consumption than the third connection state.

2. The power saving method of claim 1 further comprising: after switching from the first connection state to the second connection state, switching from the second connection state to the third connection state when the mobile device stays in the second connection state for a predetermined time.

3. The power saving method of claim 1, wherein the switching step is executed further according to a selection table which indicates correspondence of the different connection states and the screen status.

4. The power saving method of claim 3, wherein the selection table is stored in the mobile device.

5. The power saving method of claim 1, wherein the first connection state is a connected state, the second connection state is a Cell_PCH state or a Cell_FACH state, and the third connection state is an idle state.

6. The power saving method of claim 1, wherein the first connection state is a connected state, the second connection state is a Connected Discontinuous Reception (CDRX) state, and the third connection state is an idle state.

7. A mobile device in a wireless communication system, comprising:
    a screen;
    an application processor coupled to the screen, for detecting whether a screen status of the screen is on or off; and
    a modem coupled to the application processor, for switching the mobile device to different connection states according to whether the detected screen status is on or off when the mobile device has no data transmission and reception;
    wherein the modem switches the mobile device from a first connection state to a second connection state when the screen status indicates the screen is on, and switches the mobile device from the first connection state to a third connection state when the screen status indicates the screen is off, wherein the first connection state has more power consumption than the second connection state and the second connection state has more power consumption than the third connection state.

8. The mobile device of claim 7, wherein after the mobile device is switched from the first connection state to the second connection state, the modem switches the mobile device from the second connection state to the third connection state when the mobile device stays in the second connection state for a predetermined time.

9. The mobile device of claim 7, further comprising:
    a selection table, for indicating correspondence of the different connection states and the screen status;
    wherein the modem switches the mobile device to the different connection states further according to the selection table.

10. The mobile device of claim 7, wherein the first connection state is a connected state, the second connection state is a Cell_PCH state or a Cell_FACH state, and the third connection state is an idle state.

11. The mobile device of claim 7, wherein the first connection state is a connected state, the second connection state is a Connected Discontinuous Reception (CDRX) state, and the third connection state is an idle state.

* * * * *